(12) United States Patent
Uchida et al.

(10) Patent No.: US 11,906,644 B2
(45) Date of Patent: Feb. 20, 2024

(54) ELECTRONIC APPARATUS, ELECTRONIC SYSTEM, AND METHOD

(71) Applicant: KABUSHIKI KAISHA TOSHIBA, Tokyo (JP)

(72) Inventors: Daisuke Uchida, Kawasaki Kanagawa (JP); Takafumi Sakamoto, Tokyo (JP); Koji Akita, Yokohama Kanagawa (JP)

(73) Assignee: KABUSHIKI KAISHA TOSHIBA, Tokyo (JP)

(*) Notice: Subject to any disclaimer, the term of this patent is extended or adjusted under 35 U.S.C. 154(b) by 45 days.

(21) Appl. No.: 17/689,583

(22) Filed: Mar. 8, 2022

(65) Prior Publication Data

US 2023/0034995 A1 Feb. 2, 2023

(30) Foreign Application Priority Data

Jul. 29, 2021 (JP) ................. 2021-123931

(51) Int. Cl.
*G01S 5/00* (2006.01)
*G01S 5/02* (2010.01)
*H04W 64/00* (2009.01)

(52) U.S. Cl.
CPC .............. *G01S 5/009* (2013.01); *G01S 5/019* (2020.05); *H04W 64/006* (2013.01); *G01S 5/0289* (2013.01)

(58) Field of Classification Search
CPC ....... G01S 5/009; G01S 5/019; H04W 64/006
USPC ......................................................... 342/458
See application file for complete search history.

(56) References Cited

U.S. PATENT DOCUMENTS

| 10,182,306 | B2 | 1/2019 | Kanayama et al. |
| 10,440,677 | B2* | 10/2019 | O'Shea ................. H04W 24/10 |
| 2021/0190927 | A1 | 6/2021 | Sakamoto et al. |
| 2021/0194423 | A1 | 6/2021 | Yonezawa et al. |
| 2021/0409908 | A1 | 12/2021 | Yonezawa et al. |
| 2022/0011397 | A1 | 1/2022 | Sakamoto et al. |
| 2022/0200711 | A1 | 6/2022 | Uchida et al. |

FOREIGN PATENT DOCUMENTS

| JP | 2020008533 A | 1/2020 |
| JP | 2020094837 A | 6/2020 |
| JP | 2022098802 A | 7/2022 |

OTHER PUBLICATIONS

U.S. Appl. No. 17/689,520, First Named Inventor: Daisuke Uchida; Title: "Electronic Apparatus, Electronic System, and Method"; filed Mar. 8, 2022.

* cited by examiner

*Primary Examiner* — Harry K Liu
(74) *Attorney, Agent, or Firm* — Holtz, Holtz & Volek PC

(57) ABSTRACT

According to one embodiment, an electronic apparatus includes a processor configured to estimate positions of wireless devices communicating each other from a plurality of position candidates based on position candidate information indicating the position candidates of the wireless devices and communication information between the plurality of wireless devices located in any of the plurality of position candidates, and determine a first position among the position candidates according to a likelihood of the wireless devices estimated to be located in the position candidates.

18 Claims, 14 Drawing Sheets

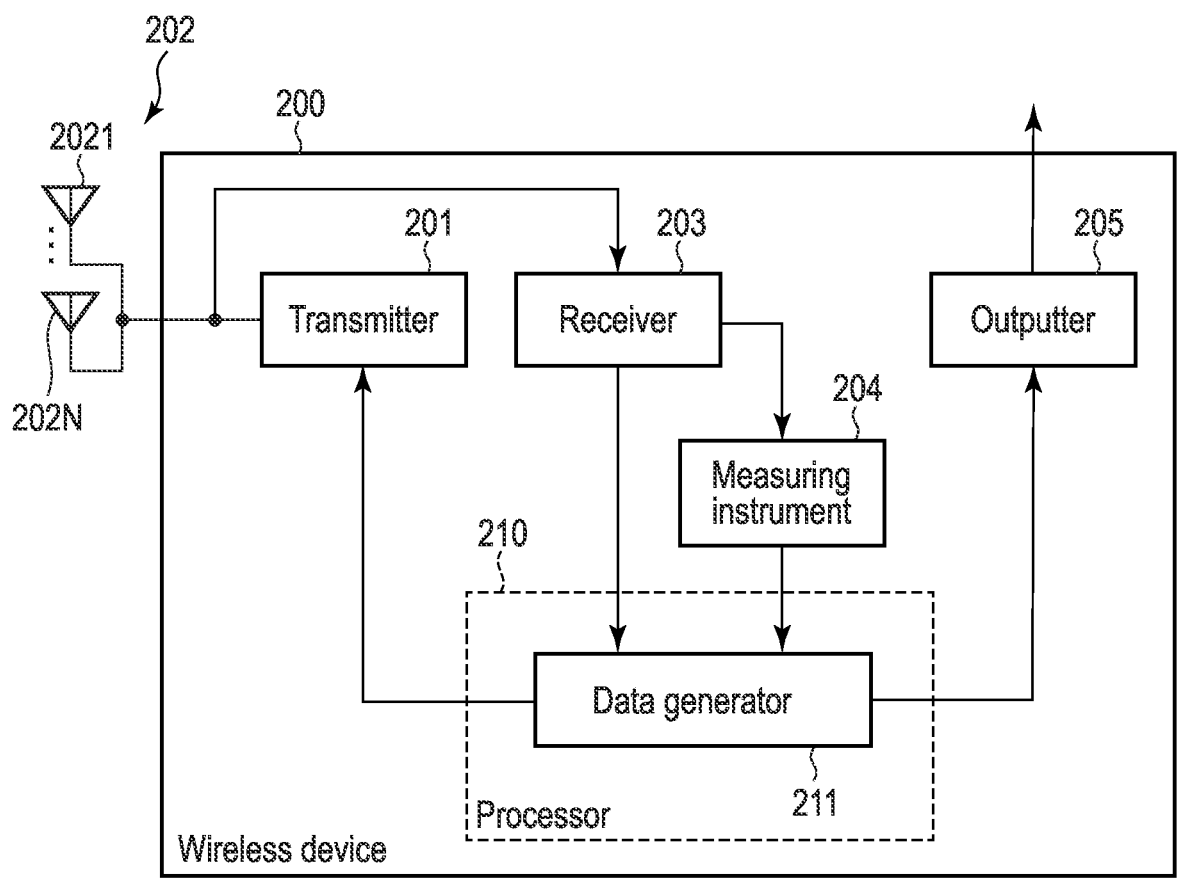
F I G. 3

| | d1 | d2 | d3 |
|---|---|---|---|
| p1 | 3 | 0 | 2 |
| p2 | 0 | 5 | 0 |
| p3 | 2 | 0 | 3 |

L1

| | | d3L-2 | d3L-1 | d3L | (L: 1~7) |
|---|---|---|---|---|---|
| L1 | p1 | 308 | 132 | 416 | |
| | p2 | 219 | 586 | 51 | |
| | p3 | 329 | 138 | 389 | |
| L2 | p4 | 395 | 112 | 349 | |
| | p5 | 130 | 639 | 87 | |
| | p6 | 331 | 105 | 420 | |
| L3 | p7 | 374 | 323 | 159 | |
| | p8 | 114 | 183 | 559 | |
| | p9 | 368 | 350 | 138 | |
| L4 | p10 | 447 | 44 | 365 | |
| | p11 | 63 | 793 | 0 | |
| | p12 | 346 | 19 | 491 | |
| L5 | p13 | 464 | 183 | 209 | |
| | p14 | 31 | 408 | 417 | |
| | p15 | 361 | 265 | 230 | |
| L6 | p16 | 237 | 289 | 330 | |
| | p17 | 417 | 251 | 188 | |
| | p18 | 202 | 316 | 338 | |
| L7 | p19 | 340 | 197 | 319 | |
| | p20 | 150 | 443 | 263 | |
| | p21 | 366 | 216 | 274 | |

FIG. 15

: First positions

| (L: 1~7) | d3L-2 | d3L-1 | d3L | Correlation of rows or columns other than the largest number of counts |
|---|---|---|---|---|
| L1  p1 | 308 | 132 | 416 | |
| L1  p2 | 219 | 586 | 51 | 0.988 / 0.970 |
| L1  p3 | 329 | 138 | 389 | |
| L2  p4 | 395 | 112 | 349 | |
| L2  p5 | 130 | 639 | 87 | 0.909 / 0.906 |
| L2  p6 | 331 | 105 | 420 | |
| L3  p7 | 374 | 323 | 159 | |
| L3  p8 | 114 | 183 | 559 | 0.987 / 0.985 |
| L3  p9 | 368 | 350 | 138 | |
| L4  p10 | 447 | 44 | 365 | |
| L4  p11 | 63 | 793 | 0 | 0.878 / 0.875 |
| L4  p12 | 346 | 19 | 491 | |
| L5  p13 | 464 | 183 | 209 | |
| L5  p14 | 31 | 408 | 417 | -0.971 / 0.962 |
| L5  p15 | 361 | 265 | 230 | |
| L6  p16 | 237 | 289 | 330 | |
| L6  p17 | 417 | 251 | 188 | 0.954 / 0.929 |
| L6  p18 | 202 | 316 | 338 | |
| L7  p19 | 340 | 197 | 319 | |
| L7  p20 | 150 | 443 | 263 | 0.869 / 0.564 |
| L7  p21 | 366 | 216 | 274 | |

FIG. 19

|  |  | d3L-2 | d3L-1 | d3L | (L: 1~7) |
|---|---|---|---|---|---|
| L1 | p1 | 308 | 132 | 416 | |
| | p2 | 219 | 586 | 51 | |
| | p3 | 329 | 138 | 389 | |
| L2 | p4 | 395 | 112 | 349 | |
| | p5 | 130 | 639 | 87 | |
| | p6 | 331 | 105 | 420 | |
| L3 | p7 | 374 | 323 | 159 | |
| | p8 | 114 | 183 | 559 | |
| | p9 | 368 | 350 | 138 | |
| L4 | p10 | 447 | 44 | 365 | |
| | p11 | 63 | 793 | 0 | |
| | p12 | 346 | 19 | 491 | |
| L5 | p13 | 464 | 183 | 209 | |
| | p14 | 31 | 408 | 417 | |
| | p15 | 361 | 265 | 230 | |
| L6 | p16 | 237 | 289 | 330 | |
| | p17 | 417 | 251 | 188 | |
| | p18 | 202 | 316 | 338 | |
| L7 | p19 | 340 | 197 | 319 | |
| | p20 | 150 | 443 | 263 | |
| | p21 | 366 | 216 | 274 | |

FIG. 21

ELECTRONIC APPARATUS, ELECTRONIC SYSTEM, AND METHOD

CROSS-REFERENCE TO RELATED APPLICATIONS

This application is based upon and claims the benefit of priority from Japanese Patent Application No. 2021-123931, filed Jul. 29, 2021, the entire contents of which are incorporated herein by reference.

FIELD

Embodiments described herein relate generally to an electronic apparatus, an electronic system, and a method.

BACKGROUND

It is known that propagation characteristics (for example, RSSI or the like) between a plurality of wireless devices are measured, and a position where each of the plurality of wireless devices is located is estimated. Here, there is a possibility that a likelihood of the wireless device estimated to be located varies depending on the position. Therefore, it is desirable to determine a position candidate according to this likelihood.

BRIEF DESCRIPTION OF THE DRAWINGS

FIG. 3 is a configuration diagram of a wireless device 200 according to the first embodiment.

FIG. 15 is a diagram showing a result of counting the number of wireless devices 200 arranged in each position candidate.

FIG. 19 is a diagram showing correlation values of rows or columns for each group.

FIG. 21 is a diagram showing a result of counting the number of wireless devices 200 arranged in each position candidate in a modification applicable to the first embodiment.

DETAILED DESCRIPTION

Figure 1:
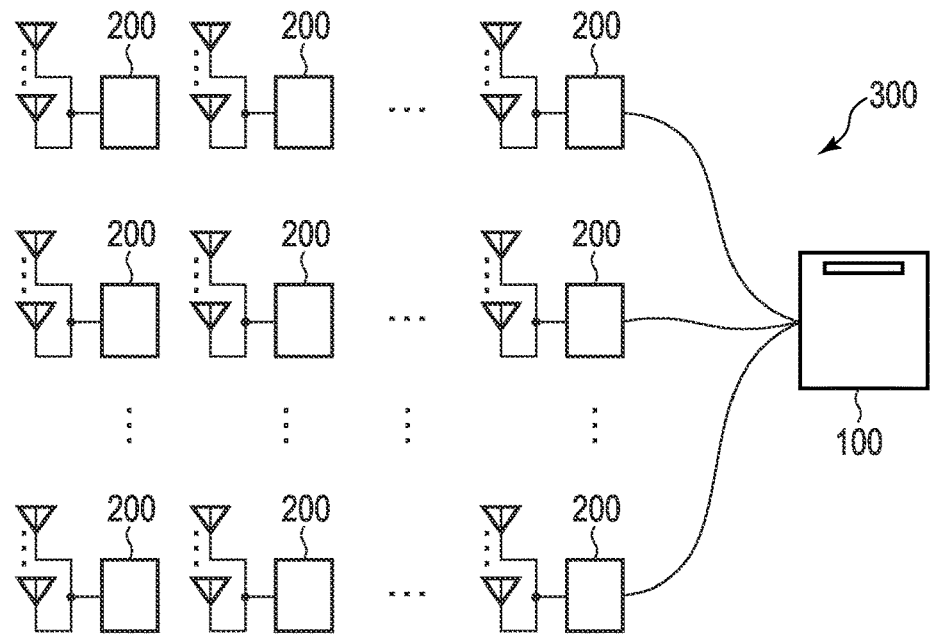
FIG. 1 is a schematic diagram of a communication system 300 according to a first embodiment.

In general, according to one embodiment, an electronic apparatus includes a processor configured to estimate positions of wireless devices communicating each other from a plurality of position candidates based on position candidate information indicating the position candidates of the wireless devices and communication information between the plurality of wireless devices located in any of the plurality of position candidates, and determine a first position among the position candidates according to a likelihood of the wireless devices estimated to be located in the position candidates.

Various embodiments will be described hereinafter with reference to the accompanying drawings. Disclosure is only an example, invention is not limited by the contents described in the following embodiments. In the drawings, the size, shape, and the like may be schematically represented to make the description more clear. In the multiple drawings, corresponding elements are denoted by the same reference numerals, and detailed description may be omitted.

First Embodiment

A first embodiment will be described. FIG. 1 shows a communication system 300 according to the first embodiment. The communication system 300 includes an estimation apparatus 100 and a plurality of wireless devices 200. The estimation apparatus 100 is a device that estimates at which position candidate each of the wireless devices 200 is located, based on information indicating candidates of positions at which the wireless devices 200 are located (hereinafter also referred to as position candidates) and information in communication between the wireless devices 200 (hereinafter also referred to as communication information). The information indicating the position candidate is also referred to as position candidate information. The estimation apparatus 100 is also referred to as an electronic apparatus, and the communication system 300 is also referred to as an electronic system.

As an application example, in a case where the wireless device 200 is provided in a device, for example, a battery module, a lighting apparatus, an air conditioner, or the like, the estimation apparatus 100 can estimate the position of the device provided with the wireless device 200 by estimating the position of the wireless device 200. Although FIG. 1 shows the communication system 300 in which the wireless devices 200 are arranged in a grid pattern, the arrangement of the wireless devices 200 is not limited to this case. Each of the wireless device 200 is located at any one of the position candidates, and communication can be performed between the estimation apparatus 100 and the wireless device 200 or between the plurality of wireless devices 200. The communication includes at least one of exchange required for communication, transmission or reception of a signal. Although FIG. 1 illustrates a case in which communication between the estimation apparatus 100 and the wireless device 200 is performed in a wired manner and communication between the wireless devices 200 is performed in a wireless manner, connection of these communications may be wireless or wired. Any standard such as Wifi (registered trademark), Bluetooth (registered trademark), or UWB (Ultra Wide Band) can be applied as the wireless communication standard.

When estimating the position of the wireless device 200, the estimation apparatus 100 determines a likelihood of the wireless device 200 located for each position candidate. This likelihood indicates an accuracy, certainty of estimation of the wireless device 200 that is assumed to be located at the position candidate. Depending on the position candidate, even if the estimation is performed using the communication information between the wireless devices 200, there is a possibility that a difference occurs in the accuracy of the estimation of the located wireless device 200. By determining the likelihood of the wireless device 200 located for each position candidate, the estimation apparatus 100 can determine one or more position candidates corresponding to the likelihood.

Figure 2:
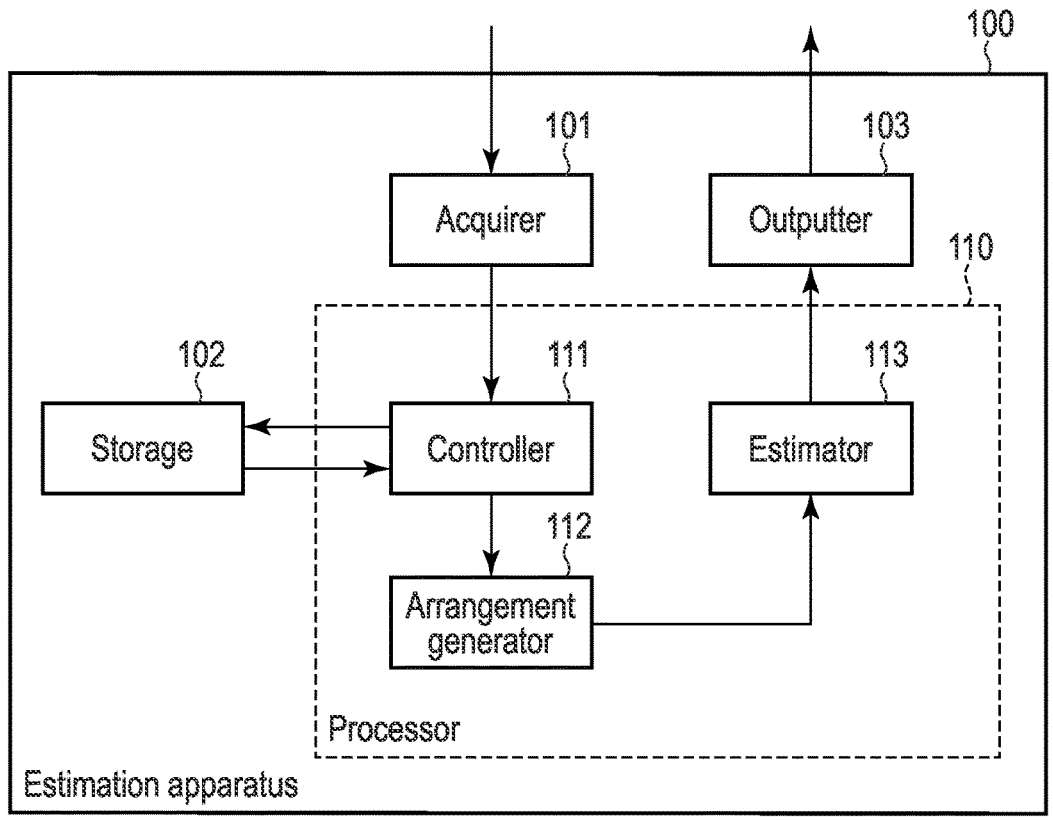
FIG. 2 is a configuration diagram of the estimation apparatus 100 according to the first embodiment.

FIG. 2 is a configuration diagram of the estimation apparatus 100. The estimation apparatus 100 includes an acquirer 101, a processor 110, a storage 102, and an outputter 103. The processor 110 includes a controller 111, an arrangement generator 112, and an estimator 113.

The acquirer 101 is a device or an element that acquires the position candidate information and the communication information. The acquirer 101 acquires these pieces of information by performing an information processing an input or an object. For example, the acquirer 101 may acquire the position candidate information by an input from a user, may acquire the position candidate information by image processing or the like by inputting or scanning a drawing describing positions where the wireless devices 200 are located, or may acquire the position candidate information by image processing or the like by capturing or inputting an image representing an installation of the wireless devices 200. The acquirer 101 acquires the communication information from the wireless device 200, and may acquire the communication information by wired communication or wireless communication. Further, the acquirer 101 may acquire at least a part of the communication information not directly from the wireless device 200 but via a collection apparatus, a storage device, a database of the communication information, or the like.

The communication information includes propagation data such as, for example, received power (RSSI: Received Signal Strength Indicator), a signal-to-noise ratio (SN ratio: Signal to Noise Ratio), and an error rate (PER: Packet Error Rate) in communication between the plurality of wireless devices 200, and identification information of the wireless device 200 in communication between the plurality of wireless devices 200 (hereinafter also referred to as wireless device identification information). The wireless device identification information is information for specifying each wireless device 200. The wireless device identification information is, for example, a MAC address or an IP address, but any information can be applied as long as each wireless device 200 can be individually specified. The communication information includes at least one of identification information of an antenna used for communication by the wireless device 200 (hereinafter also referred to as antenna identification information), reception time information of a signal used for communication (hereinafter also referred to as reception time information), information indicating a frequency band used for communication (hereinafter also referred to as frequency information), and information of a polarized wave used for communication (hereinafter also referred to as polarized wave information). The antenna identification information is information for specifying an antenna provided in each of the wireless devices 200, and any information can be applied as long as each antenna can be individually specified.

The estimation apparatus 100 can individually specify each wireless device 200 included in the communication system 300 by the wireless device identification information. In a case where the antenna identification information is included in the communication information, the estimation apparatus 100 can individually specify the antenna included in each of the wireless devices 200 based on the antenna identification information. The position candidate information and the communication information are held in the storage 102, and the position candidate information and the communication information are extracted from the storage 102 and sent to the arrangement generator 112. The propagation data may be extracted from the communication information and sent.

The storage 102 holds information sent from the controller 111 and information used by the estimator 113. The storage 102 is a memory or the like, and is, for example, a random access memory (RAM), a programmable ROM (PROM), an erasable PROM (EPROM), an electrically EPROM (EEPROM), a flash memory, a register, or the like. The storage 102 may be provided not only inside the estimation apparatus 100 but also outside the estimation apparatus 100. When provided externally, the storage 102 may be a cloud that holds information via the Internet.

The controller 111 causes the storage 102 to hold the position candidate information and the communication information sent from the acquirer 101. In addition, the controller 111 extracts the position candidate information and the communication information from the storage 102 and sends them to the arrangement generator 112. In addition, the controller 111 may cause the storage 102 to hold at least one of information indicating the position where each of the wireless devices 200 is located estimated by the estimator 113 and information indicating the position determined according to the likelihood of the wireless device 200 determined by the estimator 113.

Based on the position candidate information sent from the controller 111, the arrangement generator 112 assumes a plurality of arrangements from the position candidates for the position where the wireless devices 200 are located. Here, the arrangement refers to determining the wireless devices 200 located at the position candidates. For example, it is assumed that there are two wireless devices 200d1 and 200d2 for two position candidates p1 and p2. In this case, two arrangements of (p1, 200d1), (p2, 200d2), and (p1, 200d2), (p2, 200d1) are assumable. The arrangement generator 112 assumes m arrangements (m is an integer equal to or greater than 3) for the positions of the wireless devices 200.

The arrangement generator 112 narrows down the arrangements of the wireless devices 200 sent from the arrangement generator 112. The arrangement generator 112 narrows down the arrangements of the wireless devices 200 based on the propagation data included in the communication information sent from the controller 111. Details of the narrowing down will be described later. For example, when m arrangements are arranged, the arrangement generator 112 narrows down the m arrangements to n arrangements (n: an integer equal to or greater than 2, and m>n) and assumes the n arrangements. The n arrangements may be referred to as a first arrangement to an n-th arrangement. Note that propagation data may be sent directly from the controller 111 to the estimator 113. Information on the arrangements of the wireless devices 200 assumed and narrowed by the arrangement generator 112 is sent to the estimator 113.

The estimator 113 estimates the positions where the wireless devices 200 are located from the position candidates based on the first arrangement to the n-th arrangement, and determines the likelihood of the wireless device 200 estimated to be located at each of the position candidate. The estimator 113 determines a first position (one or more first positions) among the position candidates according to the likelihood. The estimation of the positions where the wireless devices 200 are located and the determination of the likelihood of the wireless device 200 will be described in detail later. The estimator 113 sends information indicating the estimated positions where the wireless device 200 are located and information indicating the first position to the outputter 103. The estimator 113 may send one of these information.

The outputter 103 is a device or an element that outputs the information indicating the estimated positions where the wireless device 200 are located and the information indicating the first position, which are sent from the estimator 113. The outputter 103 may output one of these information. The output destination of the information is freely selected, and may be, for example, any of an information analysis device, a device that visually displays the positions where the wireless device 200 are located and the first position, a device that holds information, a notification device, and the like. The notification device may be activated when the first position is present. As a notification method of the notification device, any device can be applied as long as it can notify a user by sound, light, vibration, display on a screen, or the like. These devices may be elements (not illustrated) inside the estimation apparatus 100 or may be provided outside the estimation apparatus 100. Further, a form of the information indicating the estimated positions of the wireless devices 200 and information indicating the first position may be any of text data, image data, formatted data, or the like.

The configuration of the estimation apparatus 100 has been described above. In FIG. 2, the controller 111, the arrangement generator 112, and the estimator 113 are included in the processor 110. The processor 110 is one or more electronic circuits including a control device and an arithmetic device. The electronic circuit is realized by an analog or digital circuit or the like. For example, a general purpose processor, central processor (CPU), microprocessor, digital signal processor (DSP), ASIC, FPGA, and combinations thereof are possible. Further, the functions of the processor 110 may be executed by these electronic circuits by software.

The estimator 113 may send the information indicating the estimated positions where the wireless devices 200 are located and the information indicating the first position to the controller 111. The controller 111 may cause the storage 102 to hold the information, and may extract the information as necessary and send them to the outputter 103. In addition, the information indicating the estimated positions where the wireless devices 200 are located and the information indicating the first position may be sent to any one of the outputter 103 or the controller 111. Although the arrangement generator 112 assumes m arrangements and the estimator 113 assumes n arrangements from the m arrangements, the position candidate information and the communication information may be sent to the arrangement estimator 112 and the arrangement estimator 112 may assume n arrangements based on the propagation data included in the position candidate information and the communication information. The n arrangements are the same as the description of narrowing down, and will be described later.

FIG. 3 is a configuration diagram of the wireless device 200. The wireless device 200 includes a transmitter 201, an antenna unit 202, a receiver 202, a measuring instrument 204, a processor 210, and an outputter 205. The antenna unit 202 is an array antenna including N antennas (N is an integer of 2 or more), antennas 2021, . . . , and 202N. The processor 210 includes a data generator 211.

The transmitter 201 modulates a signal for measuring propagation data between the wireless devices 200 (hereinafter, also referred to as a transmission signal) and transmits the signal via the antenna unit 202. The transmission signal includes wireless device identification information of the wireless device 200 as a transmission source. In addition, the transmission signal may further include at least one of antenna identification information of an antenna that radiates the transmission signal, frequency information indicating a frequency band used for communication, information indicating a type of an electromagnetic wave of the transmission signal, or information indicating an airflow between the wireless devices 200 that perform communication. Any transmission form can be applied. For example, a wireless device of a transmission destination may be designated, transmission may be performed by broadcast, or transmission may be performed in synchronization with the wireless device of the transmission destination.

The antenna unit 202 is an array antenna including N antennas 2021, . . . , 202N. The antenna unit 202 radiates the transmission signal sent from the transmitter 201, and the antenna unit 202 is also used to receive a signal for measuring propagation data between communication destination wireless devices 200 transmitted from the communication destination wireless devices 200 (hereinafter, this signal is also referred to as a reception signal). When transmitting the transmission signal or receiving the reception signal, the antenna unit 202 may perform be used for the transmission or the reception while switching antennas. For example, the antennas may be switched at predetermined time intervals or by synchronizing with the wireless device 200 of the communication destination.

The receiver 203 receives and demodulates the reception signal transmitted from the wireless device 200 of the communication destination via the antenna unit 202. The reception signal includes at least wireless device identification information of the wireless device 200 of the transmission source. The receiver 203 sends information included in the received signal and wireless device identification information of the receiving side (itself) to the data generator 211.

The receiver 203 also sends the received signal to the measuring instrument 204. In a case where the antenna identification information of the wireless device 200 of the transmission source is included in the reception signal, the receiver 203 may send the antenna identification information of the reception side (itself) to the data generator 211. Further, the receiver 203 may send information indicating the time at which the reception signal is received to the data generator 211.

The measuring instrument 204 measures propagation data from the reception signal sent from the receiver 203. The measured propagation data is sent to the data generator 211. The measurement value of the propagation data may be a value measured once or a maximum value, a minimum value, a mode value, a median value, or an average value measured a plurality of times.

The data generator 211 generates communication information by associating the information included in the reception signal sent from the receiver 203 (for example, the wireless device identification information of the wireless devices on the transmission side and the reception side) with the propagation data of the reception signal sent from the measuring instrument 204. The data generator 211 sends the generated communication information to the outputter 205. In a case where at least one of the antenna identification information of the transmission side and reception side (itself), the information indicating the time at which the reception signal is received, or the like is sent from the receiver 203, the data generator 211 generates the communication information in association with the information included in the reception signal and the propagation data.

When the wireless device 200 serves as the transmission side, the data generator 211 generates the transmission signal and sends to the transmitter 201.

The outputter 205 outputs the communication information sent from the data generator 211 to the estimation apparatus 100. For example, as illustrated in FIG. 1, in a case where the wireless device 200 and the estimation apparatus 100 are connected to each other by wire, the output is performed by wire. In a case where the wireless device 200 and the estimation apparatus 100 are wirelessly connected, the outputter 205 may be integrated with the transmitter 201 and output to the estimation apparatus 100 via the antenna unit 202. In addition, the outputter 205 may output the communication information to an external storage device or a cloud and cause to hold the communication information. In this case, the estimation apparatus 100 extracts and acquires the communication information from the external storage device or the cloud.

The configuration of the wireless device 200 has been described above. In the communication system 300 of the present embodiment, it is assumed that the wireless device 200 has at least the components described above. In FIG. 3, the measuring instrument 204 is not included in the processor 210, but may be included in the processor 210 depending on propagation data to be measured. For example, in a case where digital processing is necessary for measurement of propagation data. A device similar to the device described in the processor 110 can be applied to the processor 210, and the function thereof may be executed by software.

Figure 4:
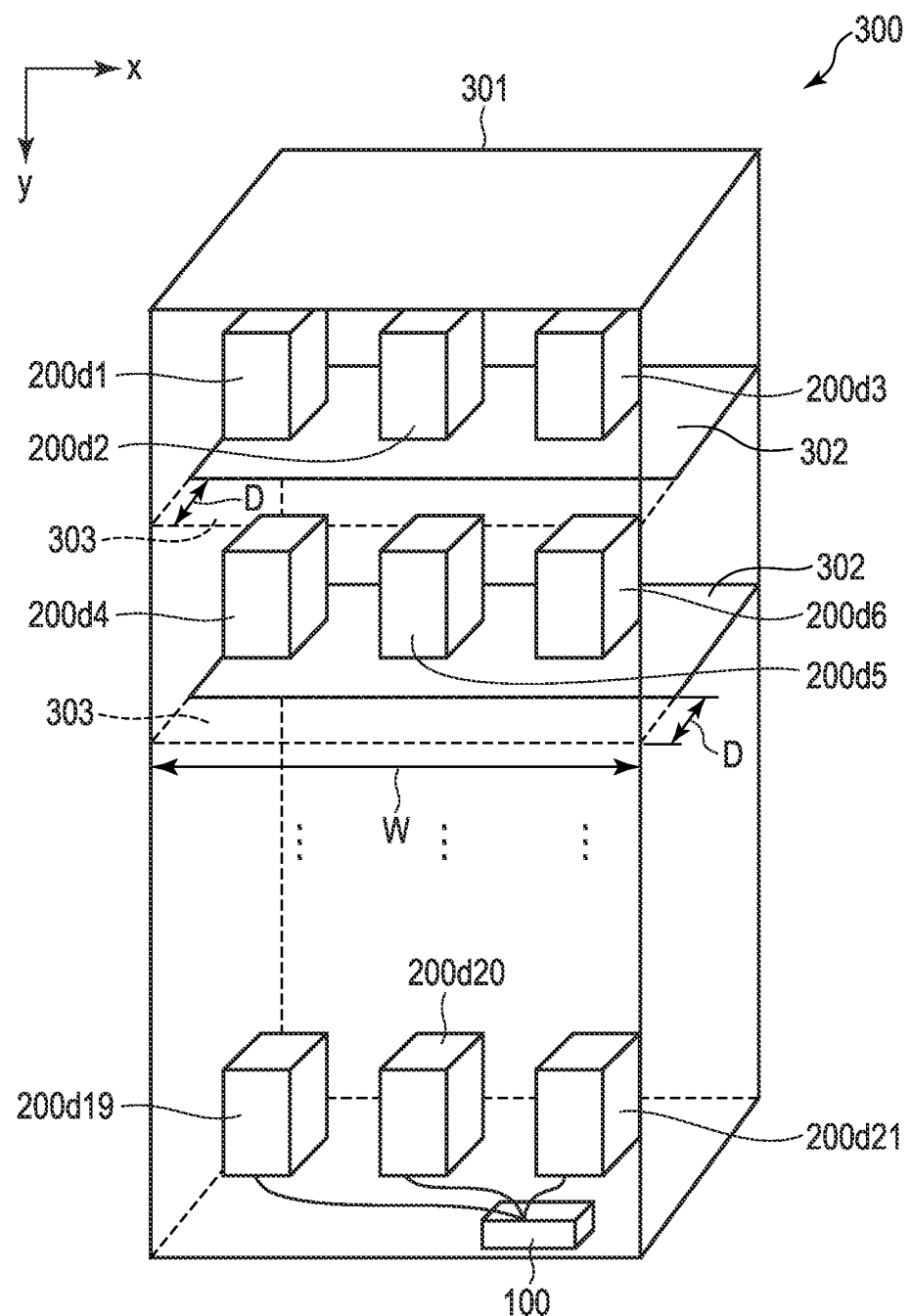
FIG. 4 is a configuration diagram of the communication system 300 according to an application example of the first embodiment.

Hereinafter, the present embodiment will be described with reference to application examples. FIG. 4 is a configuration diagram of the application example of the communication system 300 (hereinafter, also simply referred to as a communication system 300). The communication system 300 includes the estimation apparatus 100, wireless devices 200$d$1 to 200$d$21, a housing case 301, and a shield (shields) 302. For the sake of description, FIG. 4 visualizes the estimation apparatus 100, the wireless devices 200$d$1 to 200$d$21, and the shield 302, which are located inside the housing case 301, transparent a part of the housing case 301. The wireless devices 200$d$1 to 200$d$21 and the shield 302 are components provided inside the housing case 301. The estimation apparatus 100 is provided inside the housing case 301 in FIG. 4, but may be provided outside the housing case 301. In addition, a space (spaces) 303 is formed by the housing case 301 and the shield 302. Although partially omitted in FIG. 4, the estimation apparatus 100 and the wireless device 200 are connected by a wire. This connection may be wireless. In this application example, a case where the number of wireless devices 200 is 21 and the number of position candidates is 21 will be described. However, any number of two or more wireless devices 200 and any number of two or more position candidates can be similarly applied.

Since the estimation apparatus 100 and the wireless devices 200$d$1 to 200$d$21 are the same as those described above, the same reference numbers are given and the description thereof is omitted. The housing case 301 is a housing for providing wireless devices 200$d$1 to 200$d$21 therein. Any material can be applied to the housing case 301. For example, the material may be metal, resin, or a hybrid material thereof.

The shield 302 is to be provided inside the housing case 301 and is to partition internal space of the housing case 301. The shield 302 supports the wireless device 200. That is, since the shield 302 is provided in the housing case 301, the shield 302 serves as a shelf for supporting the wireless device 200. Due to the shield 302, wireless devices 200 provided on different shields 302 are not linearly visible to each other and communicate through the shield 302.

The space 303 is an area formed by providing the shield 302 inside the housing case 301. In FIG. 4, an area having a width W and a depth D is formed on a plane parallel to the surface of the shield 302. That is, the inside of the housing case 301 is not completely partitioned by the shield 302, and an open ceiling due to the space 303 exists in a part of the inside of the housing case 301. In FIG. 4, the space 303 is a space, but may be provided in a part of the shield 302. Further, the shield 302 may be an object instead of a space. In this case, the material of the space 303 is a material that transmits electromagnetic waves more easily than the shield 302. Note that even in the case where the space 303 is provided in part of the shield 302, the space 303 is formed by the housing case 301 and the shield 302.

Figure 5:
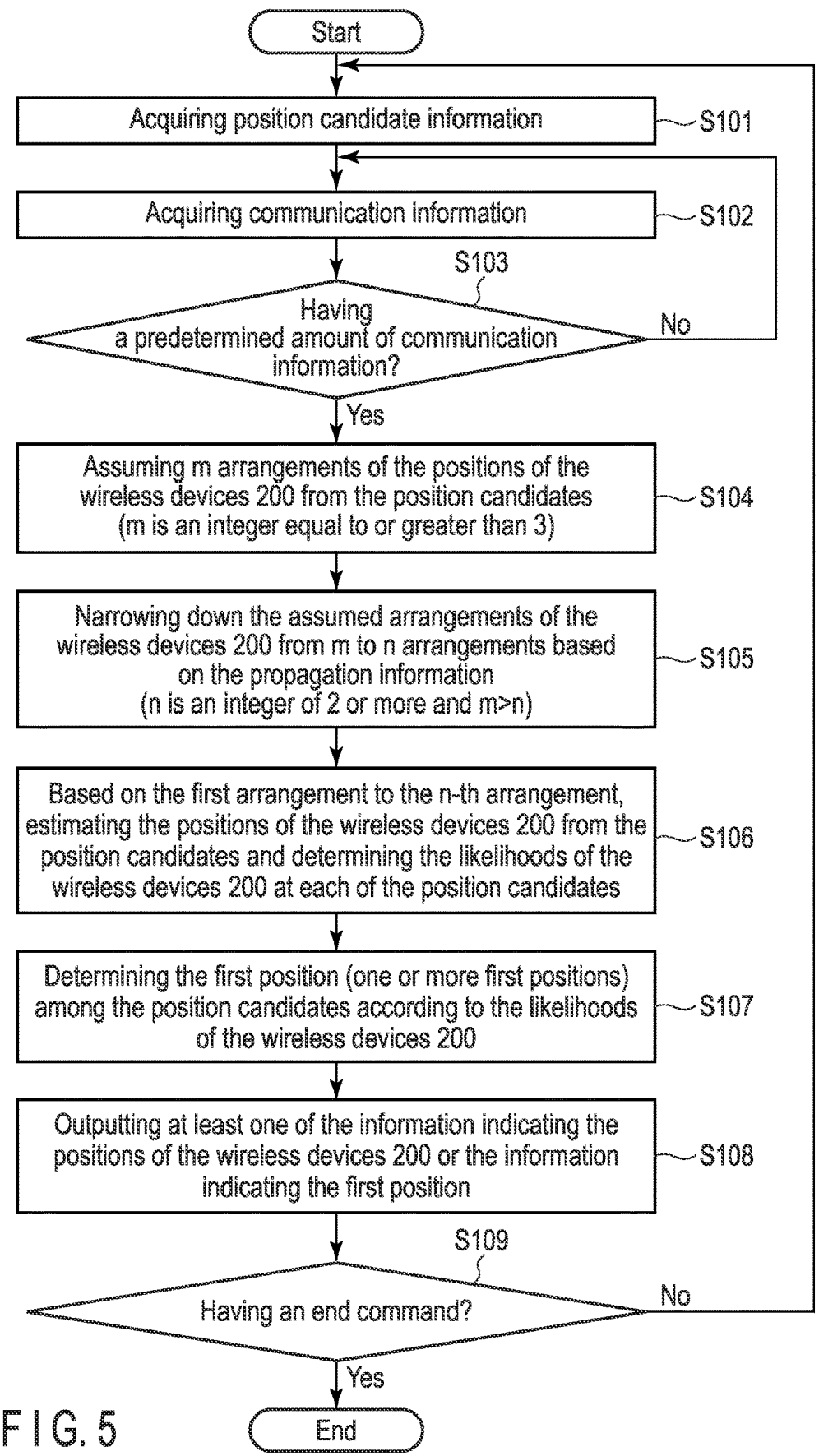
FIG. 5 is a flowchart of an estimation operation of the estimation apparatus 100 according to the first embodiment.

FIG. 5 is a flowchart of an operation of the estimation apparatus 100. Hereinafter, the operation of the estimation apparatus 100 will be described in detail with reference to FIG. 5. It is assumed that a transmission and/or reception a signal necessary for communication between the wireless devices 200 has already been completed. The estimation apparatus 100 specifies each of the wireless devices 200 based on the wireless device identification information included in the communication information. Further, in the present embodiment, as an example, a case where the propagation data is received power (RSSI) will be described.

Figure 6:
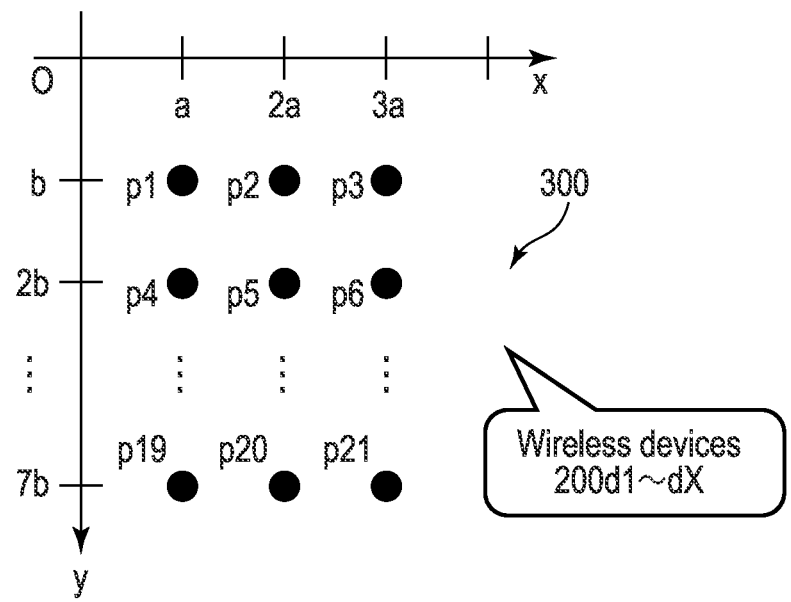
FIG. 6 is a diagram illustrating an example of position candidates of the communication system 300.

The acquirer 101 acquires the position candidate information (step S101). FIG. 6 is a diagram illustrating an example of the position candidates. It is assumed that the communication system 300 according to the present embodiment includes twenty-one position candidates p1 to p21, and each of the wireless devices 200$d$1 to 200$d$21 is located in any position candidate. Positions (coordinates) of the position candidates p1 to pX are clarified by the position candidate information. For example, in FIG. 6, each of the position candidates p1 to p21 is identified by an x coordinate and a y coordinate. The position candidate p1 is expressed as (x, y)=(a, b) (a and b are any numbers), the position candidate p2 is expressed as (x, y)=(2a, b), . . . , and the position candidate pX is expressed as (x, y)=(3a, 7b). The estimation apparatus 100 recognizes that there are twenty-one wireless devices (200$d$1 to 200$d$21) based on wireless device identification information included in communication information to be acquired later.

In the estimation system 300, the wireless devices 200$d$1 is located at the position candidate p1, . . . , and the wireless device 200$d$21 is located at the position candidate p21. However, at this time, the estimation apparatus 100 does not know in which position candidate each of the wireless devices 200$d$1 to 200$d$21 is located. The acquired position candidate information is sent to the controller 111 and is held in the storage 102 by the controller 111.

The acquirer 101 acquires the communication information between the wireless devices 200 (step S102). The acquirer 101 acquires the communication information from the wireless device 200, and generation of the communication information performed by each of the wireless devices 200 will be described below.

Figure 7:
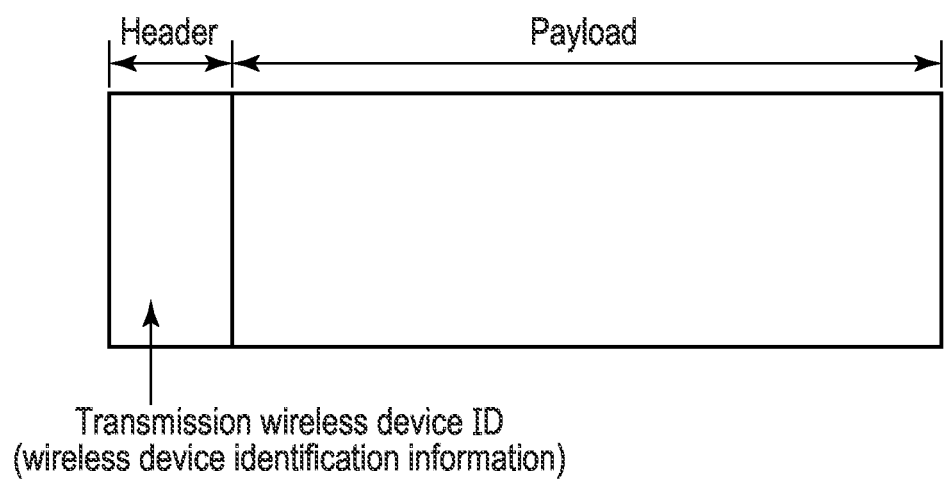
FIG. 7 is a diagram illustrating an example of a transmission signal.

The wireless device 200 on the transmission side modulates the transmission signal used for measurement of propagation data and transmits. FIG. 7 is a diagram illustrating an example of the transmission signal according to the present embodiment. In the transmission signal of the present embodiment, a transmission wireless device ID is incorporated into a header of the transmission signal as the wireless device identification information of the wireless device 200 on the transmission side. In the header of the transmission signal, a transmission antenna identifier may be incorporated as the transmission antenna identification information of the wireless device 200 on the transmission side, and a use frequency channel (CH) may be incorporated as the frequency information used for communication by the wireless device 200 on the transmission side. The wireless device 200 on the transmission side transmits the transmission signal to the wireless device 200 on the transmission destination (the reception side).

The transmission signal is received as the reception signal by the wireless device 200 on the reception side and demodulated. Further, the received power of the received signal is measured as the propagation data. The data generator 211 of the wireless device 200 on the reception side generates the communication information by associating the information included in the reception signal, the received power of the reception signal, and a reception wireless device ID as the wireless device identification information of the wireless device 200 on the reception side.

In generating the communication information, the data generator 211 of the wireless device 200 on the reception side may further associate at least one of a reception antenna identifier as the antenna identification information of the wireless device 200 on the reception side, information indicating the type of polarized wave as the type of electromagnetic wave of the reception signal, information indicating the time at which the reception signal is received, or the like. The information indicating the type of polarized wave may be included in the transmission signal (reception signal).

The generated communication information is output from the outputter 205 of the wireless device 200 on the reception side and acquired by the acquirer 101. Note that the wireless devices 200 communicate with each other switching between the transmission side and the reception side. Finally, each of the wireless devices 200$d$1 to 200$d$21 generates the communication information generated by communication with the wireless device 200 other than itself, and the communication information is output from each of the outputters 205 and is acquired by the acquirer 101. The communication information acquired by the acquirer 101 is sent to the controller 111, and the controller 111 causes the storage 102 to hold the communication information.

The controller 111 checks whether a predetermined amount of the communication information is stored in the storage 102 (step S103). The type of the amount is predetermined, and may be, for example, the data capacity, the number of data, or the like. Also, the amount may be predetermined and freely determined. In this embodiment, the type and amount of information are set in the controller 111 in advance, and are checked in step S103. If the communication information does not satisfy the predetermined amount (step S103: No), the process returns to step S102, and the acquisition of the communication information is continued. Note that step S103 and subsequent steps may be performed at predetermined time intervals separately from the acquisition of step S102.

On the other hand, when the amount of communication information satisfies the predetermined amount (step S103: Yes), the controller 111 reads the position candidate information and the communication information from the storage 102 and sends to the arrangement generator 112 and the estimator 113.

Figure 8:
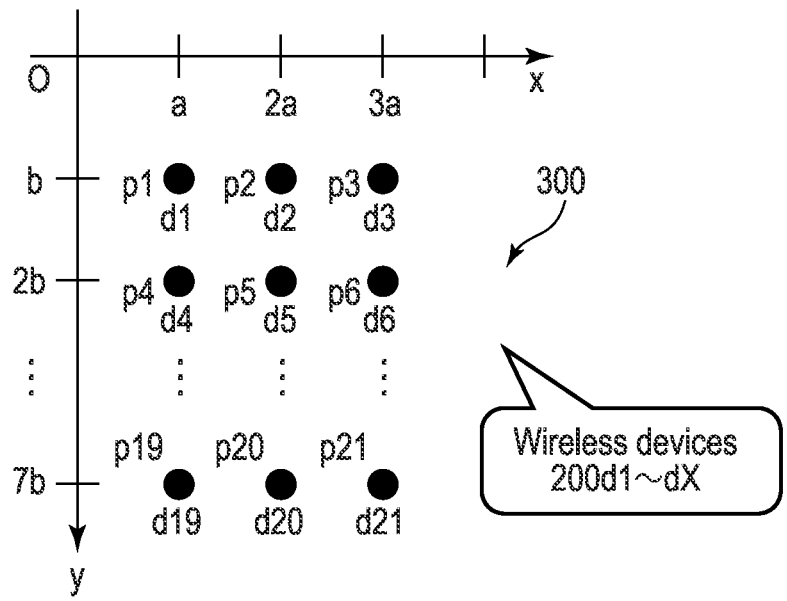
FIG. 8 is a diagram illustrating an example of an arrangement of wireless devices 200 assumed by the arrangement generator 112.

Based on the position candidate information sent from the controller 111, the arrangement generator 112 assumes the arrangements for the positions at which the wireless devices 200 are located from the position candidates (step S104). FIG. 8 is a diagram illustrating an example of an arrangement of the wireless devices 200 assumed by the arrangement generator 112. In FIG. 8, it is assumed that the arrangement generator 112 sets a wireless device 200$d$1 at the position candidate p1, sets a wireless device 200$d$2 at the position candidate p2, . . . , and sets a wireless device 200$d$21 at the position candidate p21. The arrangement generator 112 assumes a plurality of such arrangements of the wireless devices 200. For example, the arrangement generator 112 assumes m arrangements (m is an integer equal to or greater than 3) for the positions at which the wireless devices 200 are located from the position candidates.

The arrangement generator 112 narrows down the assumed arrangements of the wireless devices 200 from m to n arrangements (n is an integer of 2 or more and m>n) based on the propagation information included in the communication information sent from the controller 111 (step S105). Narrowing down of the arrangement will be described below.

Figure 9:
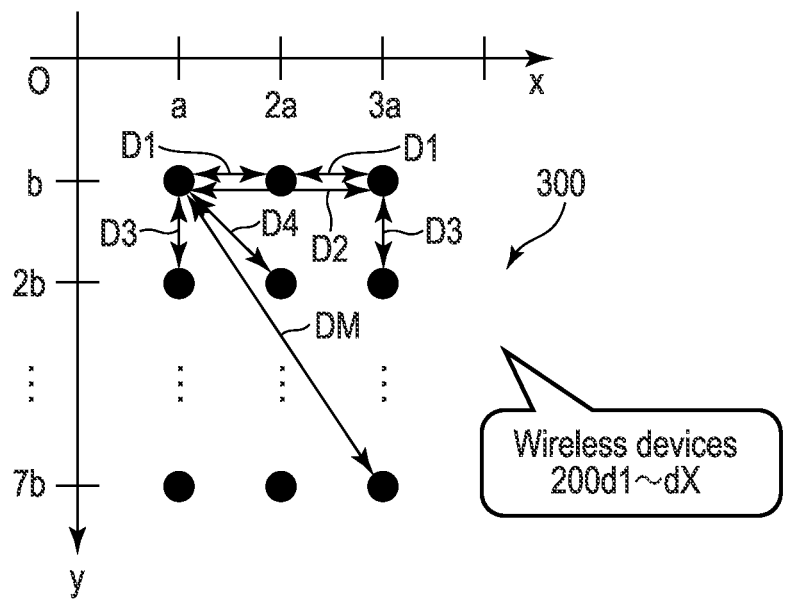
FIG. 9 is a diagram showing distances between position candidates.

The arrangement generator 112 recognizes distances between the position candidates based on the position candidate information. FIG. 9 is a diagram showing the distances between position candidates. For example, in FIG. 9, a distance between the position candidates p1 and p2 is represented by a distance D1, a distance between the position candidates p1 and p3 is represented by a distance D2, a distance between the position candidates p1 and p4 is represented by a distance D3, a distance between the position candidates p1 and p5 is represented by a distance D4, . . . , and a distance between the position candidates p1 and p21 is represented by a distance DM.

The arrangement generator 112 associates the communication information with distances between the wireless devices 200 in the assumed arrangement (hereinafter also referred to as virtual distances) for each assumed arrangement. Taking the arrangement described with reference to FIG. 8 as an example, the arrangement generator 112 associates the communication information with a virtual distance between the wireless devices 200d1 and 200d2 as distance D1, a virtual distance between the wireless devices 200d1 and 200d3 as distance D2, . . . , and virtual distance between the wireless devices 200d1 and 200d21 as distance DM. By associating the virtual distances with the communication information, the virtual distances and the propagation data are also associated with each other. When the propagation data is sent, the arrangement generator 112 may associate the virtual distances with the propagation data.

Figure 10:
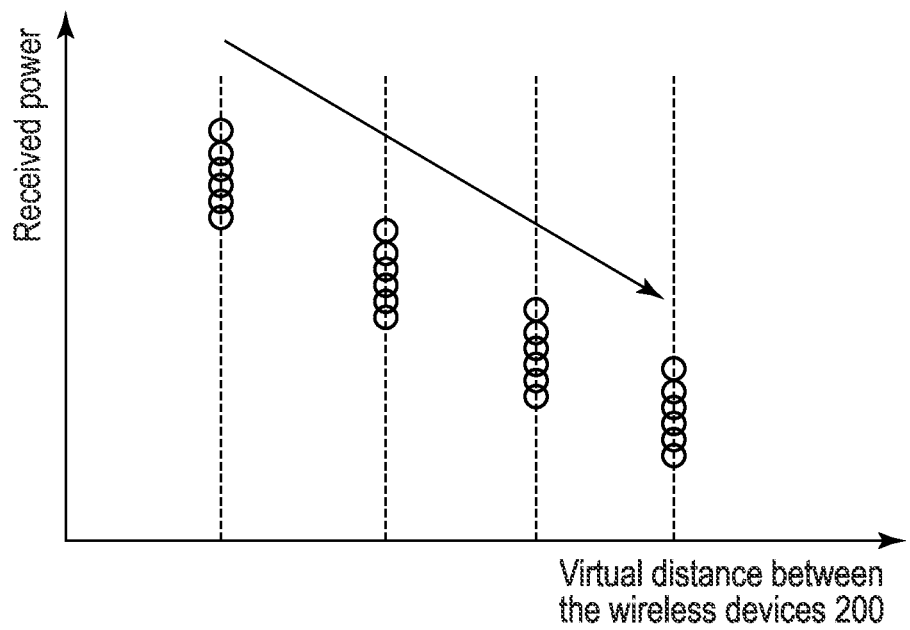
FIG. 10 is a diagram showing an example of visually representing information in which propagation data and virtual distances are associated with each other.

FIG. 10 is a diagram illustrating an example of visually representing information in which the propagation data and virtual distances are associated with each other. Even with the same virtual distance, the propagation data varies depending on a propagation environment between the wireless devices 200. However, received power tends to decrease as the distance between the wireless devices 200 increases. The arrangement generator 112 narrows down the arrangements based on the correlation between the virtual distances between the wireless devices 200 and the propagation data. For example, the arrangement generator 112 takes a correlation between virtual distances and the propagation data associated with the virtual distances. If the correlation is close to −1, there is a tendency that the received power decreases as the distance between the wireless devices 200 increases, and thus the possibility of the actual arrangement of the wireless devices 200 increases. The arrangement generator 112 determines a predetermined correlation value in advance (for example, −0.7, −0.8, or the like) and narrows down the m arrangements to n arrangements that are closer to −1 than the predetermined correlation value.

Figure 11:
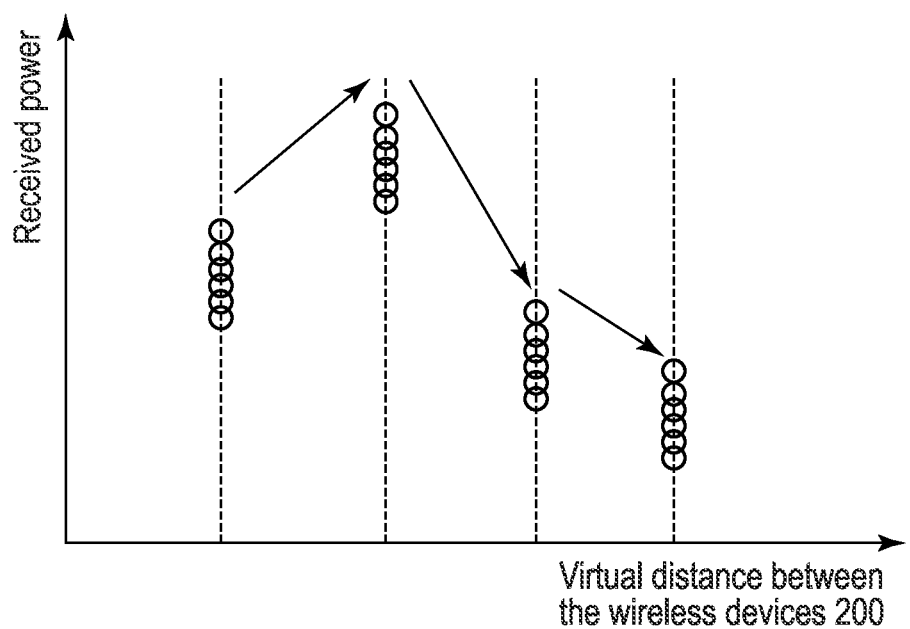
FIG. 11 is a diagram illustrating another example of visually representing information in which the propagation data and the virtual distances are associated with each other.

FIG. 11 is a diagram illustrating another example of the visually representing information in which the propagation data and the virtual distances are associated with each other. In FIG. 11, the received power does not tend to decrease as the distance between the wireless devices 200 increases in some virtual distances. In this case, when a correlation value is taken, it is highly possible that the correlation value is farther to −1 than the predetermined correlation value, and the arrangement of the wireless devices 200 in the another example does not remain in the narrowed n arrangements.

Figures 12, 13, 14:
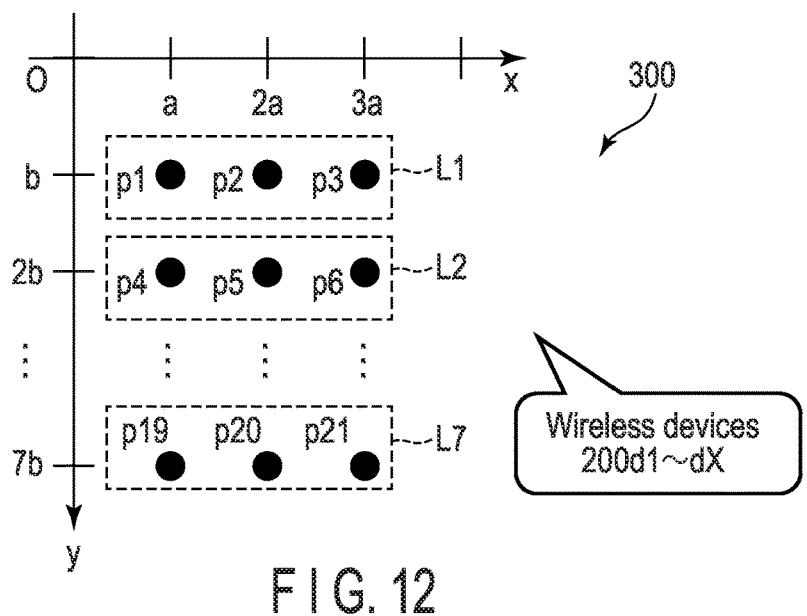
FIG. 12 is a diagram showing a group of position candidates.
FIG. 13 is a diagram showing an example of a narrowed arrangement.
FIG. 14 is a diagram for explaining estimation of the positions of wireless devices in a layer L1 in the arrangement of FIG. 13.

Further, in narrowing down the arrangements, the arrangement generator 112 divides the wireless devices 200 into a plurality of groups based on propagation data. FIG. 12 is a diagram illustrating a group of position candidates. In the present embodiment, the internal space of the housing case 301 is partitioned by the shield 302. Hereinafter, these partitioned areas are referred to as layers. In this embodiment, since the layer is set perpendicular to the y coordinate, the position candidates can be classified for each layer. For example, the position candidates p1 to p3 are layer L1, the position candidates p4 to p6 are layer L2, . . . , and the position candidates p19 to p21 are layer L7.

The arrangement generator 112 groups the wireless devices 200 based on the propagation data. As described with reference to FIG. 4, among the wireless devices 200, the wireless devices 200 arranged in different layers communicate with each other through the shield 302, and thus there is a difference in propagation data between the wireless devices 200 arranged in the same layer. For example, the received power of the wireless devices 200 arranged in different layers tends to be lower than that of the wireless devices arranged in the same layer. The arrangement generator 112 groups the wireless devices 200 by using the difference in the propagation data. For example, in the present embodiment, since the number of position candidates included in each layer is three, the arrangement generator 112 groups three wireless devices 200d1 to 200d21. Since there are layers from L1 to L7, the wireless devices 200 are grouped into seven. Here, the groups of wireless devices 200 are referred to as G1 to G7. The wireless devices 200 By grouping the wireless devices 200, it is possible to reduce arrangement of wireless devices 200 whose number of groups is not matched and to more efficiently narrow down the arrangements of the wireless devices 200.

The arrangement generator 112 sends the narrowed n arrangements (the first arrangement to the n-th arrangement) to the estimator 113. In the present embodiment, the arrangement generator 112 narrows down the arrangement by using both the correlation between the virtual distance between the wireless devices 200 and the propagation data and the grouping of the wireless devices 200, but may narrow down the arrangement by using either one of them.

Based on the first arrangement to the n-th arrangement sent from the arrangement generator 112, the estimator 113 estimates the positions where the wireless devices 200 are located from the position candidates and determines the likelihoods of the wireless devices 200 at each of the position candidates (step S106). The estimator 113 counts the number of wireless devices 200 arranged in each position candidate through the first arrangement to the n-th arrangement, estimates the positions where the wireless devices 200 are located from the position candidate based on the number (n) of assumed arrangements and the counted number of wireless devices 200 at each of the position candidates, and determines the likelihood of the wireless device 200 at each of the position candidates.

FIG. 13 is a diagram illustrating an example of the narrowed arrangements. In FIG. 13, five arrangements are shown, and in each arrangement, wireless devices 200 estimated to be located at the position candidates p1, p2, p3 from the left of the first row (the layer L1), . . . , and at the position candidates p19, p20, p21 from the left of the seventh row (the layer L7) are shown. In FIG. 13, position candidates different from the actual arrangement of the wireless devices 200 of the communication system 300 are painted with a black dot pattern, but this is for visibility and it is unknown to the estimation apparatus 100 whether or not the position candidates are different from the actual arrangement.

FIG. 14 is a diagram for explaining an estimation of the positions where the wireless devices 200 are located in the layer L1 in the arrangement of FIG. 13. The estimator 113 counts the number of each of the wireless devices 200d1 to 200d3 arranged at each of the position candidates p1 to p3 in each of the five arrangements in FIG. 13. The number of wireless devices 200 located at the position candidate p1 is counted as three in the wireless device 200d1 and two in the wireless device 200d3 among the five arrangements. Similarly, the number of wireless devices 200 located at the position candidate p2 is counted as five wireless devices 200d2 among the five arrangements, and the number of wireless devices 200 located at the position candidate p3 is counted as two wireless devices 200d1 and three wireless devices 200d3 among the five arrangements.

Similarly to the above description, the estimator 113 counts the number of each of the wireless devices 200 arranged in each of the position candidates through the first arrangement to the n-th arrangement sent from the arrangement generator 112. FIG. 15 is a diagram illustrating a result of counting the number of each of wireless devices 200 arranged at each of position candidates in n=856 ways as an example of the present embodiment.

Figures 16, 17:
FIG. 16 is a diagram illustrating an estimation result of positions where wireless devices 200 are located.
FIG. 17 is a diagram illustrating first positions in the estimation result of positions where the wireless devices 200 are located.

The estimator 113 estimates the wireless device 200 having the largest number of counts for each position candidate as the wireless device located at the position candidate. In FIG. 15, a number having the largest number of counts for each position candidate is painted in a black polka dot pattern. A label d3L-2, d3L-1, and d3L in FIG. 15 identifies wireless device 200 by assigning the number in the layer to L. In the case of the layer L1, d3L-2 represents d1, d3L-1 represents d2, d3L represents d3, . . . , and in the case of the layer L7, d3L-2 represents d19, d3L-1 represents d20, d3L represents d21. FIG. 16 is a diagram illustrating an estimation result of the positions where the wireless devices 200 are located from the result of FIG. 15. In FIG. 16, similarly to FIG. 13, position candidates different from the actual arrangement of the wireless devices 200 of the communication system 300 are painted with a black dot pattern, but this is for visibility, and it is unknown to the estimation apparatus 100 whether or not the estimation result is different from the actual arrangement.

The estimator 113 determines the likelihood of the wireless device 200 estimated to be located at the position candidate based on the number of the assumed arrangement (n) and the number of wireless devices 200 counted for each position candidate. For example, the estimator 113 determines, as the likelihood, a ratio of the number of wireless devices 200 counted for each position candidate to the number of assumed arrangements (n). This is because, as the number of wireless devices 200 counted for each position candidate with respect to the total arrangement number increases, a specific position candidate and a specific wireless device 200 are more strongly associated with each other from the propagation data, and it is considered that the accuracy of estimation of the position where the wireless device 200 is located is high.

According to the likelihoods of the wireless devices 200 at the position candidates, the estimator 113 determines the first position (one or more first positions) among the position candidates according to the likelihoods of the wireless devices 200 estimated to be located at the position candidates (step S107). FIG. 17 is a diagram illustrating the first positions to the estimation result, in FIG. 16, of the positions where the wireless devices 200 are located. In the present embodiment, the estimator 113 determines, as the first positions, one or more position candidates for which the likelihoods calculated in step S106 are lower than predetermined likelihood. This is because it is considered that the lower the likelihood, the weaker the connection between the specific position candidate and the specific wireless device 200 from the propagation data, and the lower the accuracy of the estimation of the position where the wireless device 200 is located.

Note that the estimator 113 may determine a position candidate higher than a predetermined likelihood as the first position, or may divide the likelihood into a plurality of stages and determine a position candidate of first stage as the first position, a position candidate of second stage as a second position, and so on. For example, a case where the likelihood is divided into k stages (k: an integer of 2 or more) is considered. Hereinafter, the stages of likelihood are also referred to as first likelihood to k-th likelihood. In this case, the estimator 113 may determine to which from the first likelihood to the k-th likelihood the likelihood determined for each position candidate belongs. The estimator 113 may determine, from the position candidates, a position candidate corresponding to the first likelihood, . . . , a position candidate corresponding to the k-th likelihood. Here, the estimator 113 may determine the position candidate corresponding to the first likelihood as the first position, . . . , and the position candidate corresponding to the k-th likelihood as the k-th position.

Here, a magnitude relationship from the first likelihood to the k-th likelihood can be freely determined. For example, when the first likelihood and the second likelihood are compared with each other, the first likelihood may be determined to be larger than or smaller than the second likelihood.

The estimator 113 sends information indicating the estimated positions where the wireless devices 200 are located and information indicating the first position to the outputter 103.

The outputter 103 outputs at least one of the information indicating the positions where the wireless devices 200 are located or the information indicating the first position sent from the estimator 113 to an output destination (step S108). In a case where the information indicating the positions where the wireless devices 200 are located and the information indicating the first position are held in the storage 102, the controller 111 may hold these pieces of information in the storage 102. The controller 111 may extract these pieces of information from the storage 102 and send them to the outputter 103 as necessary, and the outputter 103 may output these pieces of information to the output destination. In addition, the information indicating the positions where the wireless devices 200 are located and the information indicating the first position may have different transmission destinations or output destinations.

The controller 111 checks whether or not an end command for terminating the operation of the estimation apparatus 100 is arrived (step S109). The end command is a command to end the operation of the estimation apparatus 100 in this flow. The end command is sent to the controller 111 by being input to the estimation apparatus 100 by a user, by the estimation apparatus 100 acquiring a signal including the end command, or the like. The end command may be a command to immediately end the operation of the estimation apparatus 100.

If the end command is not arrived at the controller 111 (step S109: No), the process returns to step S101. If there is no change in the position candidate information, the process may return to step S102. On the other hand, when the end command is arrived at the controller 111 (step S109: Yes), the flow ends, and the estimation apparatus 100 ends the operation. After returning to step S101 or S102, the estimation apparatus 100 may perform the operation of this flow again under predetermined condition. When the flow returns, the controller 111 may delete the communication information from the storage 102, when the communication information are used for the estimation of positions of the wireless devices 200 a predetermined number of times (for example, once).

The estimation apparatus 100 according to the present embodiment has been described above. The estimation apparatus 100 described in the present embodiment is an example, and various modifications can be implemented and executed. Hereinafter, modifications of the communication system 300 including the estimation apparatus 100 will be described.

(First Modification)

Figure 18:
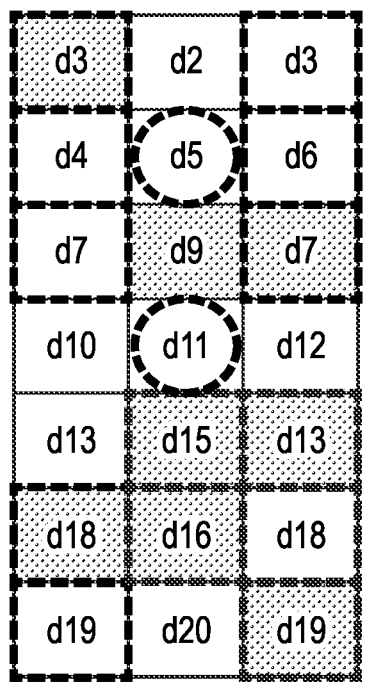
FIG. 18 is a diagram illustrating the first positions and second positions in an estimation result of positions where the wireless devices 200 are located.

The estimator 113 may determine a second position (one or more second positions) that are positions determined according to the likelihood of the wireless device 200 estimated to be located at the position candidate as in the case of the first position and that are positions higher than a predetermined likelihood. That is, the accuracy of estimation of the located wireless device 200 at the second position is higher than that at the first position. The estimator 113 may determine the second position corresponding to a likelihood greater than a likelihood corresponding to the first position. FIG. 18 is a diagram illustrating the first positions and the second positions in the estimation result, in FIG. 16, of the positions where the wireless devices 200 are located. The estimator 113 may send information indicating the second position to the outputter 103 or may send the information to the controller 111 and cause the storage 102 to hold.

By determining the second position where the likelihood is higher than the predetermined likelihood (the likelihood is higher than the first position), when the information indicating the first position and the second position is output, it is possible to present the position where the accuracy of estimation of the wireless devices 200 located to the user is high. In addition, the estimator 113 may determine that the wireless device 200 located at the second position is known wireless device 200. The estimator 113 may estimate the positions of the remaining wireless devices 200 by regarding that the known wireless device 200 is located at the second position in the subsequent estimation. As a result, the number of positions of the wireless devices 200 estimated by the estimator 113 in the subsequent estimation decreases, and processing load of the estimator 113 can be reduced.

(Second Modification)

The estimator 113 may calculate correlation values for each group in the determination of the likelihood of the wireless device 200 estimated to be located the position candidate. The estimator 113 may determine the first position also based on the correlation values. FIG. 19 is a diagram showing correlation values of rows or columns for each group in the result of FIG. 15. The correlation values of rows or columns for each group are described below. In the modification, a group of wireless devices 200 in the layer L1 is called group G1, . . . , a group of wireless devices 200 in the layer L7 is called group G7.

The correlation values of rows of each group are coordinated in correspondence with two axes for rows other than a row having the largest number in a group. For example, in the group G1, the maximum number is 586 and a row having the maximum number is second row. The numbers in first row are 308, 132, and 416 from the left, and the numbers in third row are 329, 138, and 389 from the left. When the numbers in the first row and the numbers in the third row are converted into coordinates, (308, 329), (132, 138), and (416, 389) are obtained. When these points are correlated, a correlation value of the rows in the group G1 is 0.988.

The correlation values of columns for each group are coordinated in correspondence with two axes for columns other than a column having the largest number in a group. For example, in the group G1, the maximum number is 586 and a column having the maximum number is second column. The numbers in first column are 308, 219, and 329 from the top, and the numbers in third column are 416, 51, and 389 from the top. When the numbers in the first column and the numbers in the third column are converted into coordinates, (308, 416), (219, 51), and (329, 389) are obtained. When these points are correlated, a correlation value of the columns in the group G1 is 0.970.

In the largest number of groups, it is considered that the accuracy of estimation of the wireless device 200 at the position candidate is high. However, in the position candidates other than the maximum number, when the tendency of the located wireless devices 200 is similar (the closer a correlation value to 1, the more similar), the position of the wireless device 200 is not uniquely determined, and the accuracy of estimation is considered to be low. A correlation value of rows or a correlation value of columns are calculated for each group, and when the higher correlation value is higher than a predetermined correlation value, it is considered that the accuracy of the estimation result in the group for which the correlation value has been calculated is low. By determining the likelihood further based on the correlation values, it is possible to determine the first position according to the likelihood. In the present embodiment, a group having a correlation value exceeding 0.98 is set as a target of the first positions.

Figure 20:
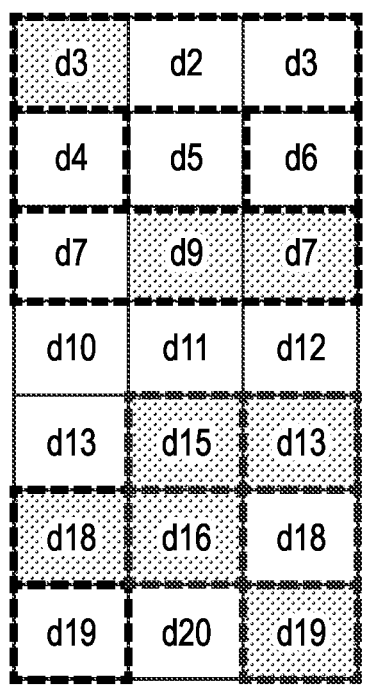
FIG. 20 is a diagram showing the first positions in the first embodiment to which first positions in a modification applicable to the first embodiment is added.

The estimator 113 similarly calculates correlation values for the groups G2 to G7. The correlation values of the groups G1 and G3 exceed 0.98. The estimator 113 determines the groups G1 and G3 as the first positions. FIG. 20 is a diagram showing first positions according to the present modification added to the first positions according to the present embodiment. The groups G1 and G3 are determined as the first positions. Thus, the position candidate p8 that is not determined in the present embodiment is also determined as the first position in the present modification example.

(Third Modification)

In the present embodiment, it is estimated that a wireless device 200 having the largest number of wireless devices 200 counted for each position candidate is located at the position candidate, but in FIG. 16, it may be estimated that the same wireless devices 200 are located in position candidates p1 and p3, p7 and p9, and the like.

In this modification example, the position of the wireless device 200 is estimated so that there is no overlap of the located wireless devices 200. When there is an overlap of the located wireless devices 200, the estimator 113 estimates a position candidate having a large count of the overlapped wireless devices 200 as a place where the wireless device 200 is located. For example, the group G1 will be described as an example.

In the example of FIG. 16, the wireless device 200d3 has the largest number of counts in each of the position candidates p1 and p3. The estimator 113 compares the count number of the wireless device 200d3 in the position candidate p1 with the count number of the wireless device 200d3 in the position candidate p3, and estimates that the wireless device 200d3 is located in a position candidate having a larger count number. In this case, since the count number of the wireless device 200d3 is 416 in the position candidate p1 and 389 in the position candidate p3, the estimator 113 estimates that the wireless device 200d3 is located at the position candidate p1. The estimator 113 estimates that a wireless device 200 of the next largest count number is located at the position candidate p3 which is not selected as the position at which the wireless device 200d3 is located. In this case, the estimator 113 estimates that the wireless device 200d1 is located at the position candidate p3.

FIG. 21 shows a result of counting the number of wireless devices 200 located in each position candidate in the modification example. In FIG. 21, the count number of the wireless devices 200 estimated so that there is no overlap of the wireless device 200 for each position candidate is represented by being painted with a black dot pattern.

Figure 22:
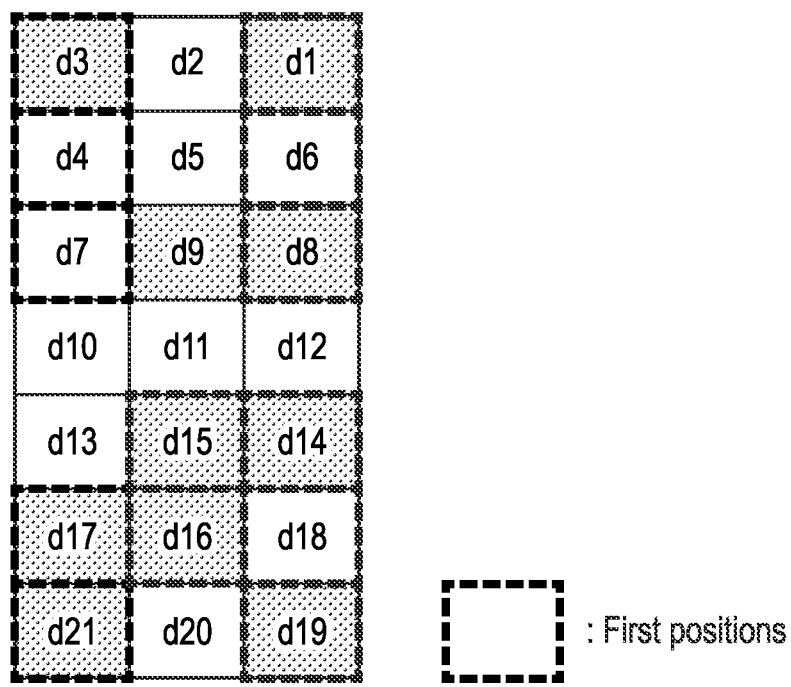
FIG. 22 is a diagram illustrating an estimation result of positions where wireless devices 200 are located and first positions according to a modification applicable to the first embodiment.

FIG. 22 is a diagram illustrating an estimation result of the positions where the wireless devices 200 are located and the first positions from the result of FIG. 15. In FIG. 22, similarly to FIG. 13 and the like, position candidates different from the actual arrangement of the wireless devices 200 of the communication system 300 are painted with a black dot pattern, but this is for visibility, and it is unknown to the estimation apparatus 100 whether or not the position candidates are different from the actual arrangement.

As described above, the estimator 113 can estimate the positions of the wireless devices 200 so that the wireless devices 200 do not overlap. Also in the modified example, the first position can be determined the same manner as in the present embodiment.

(Fourth Modification)

Figure 23:
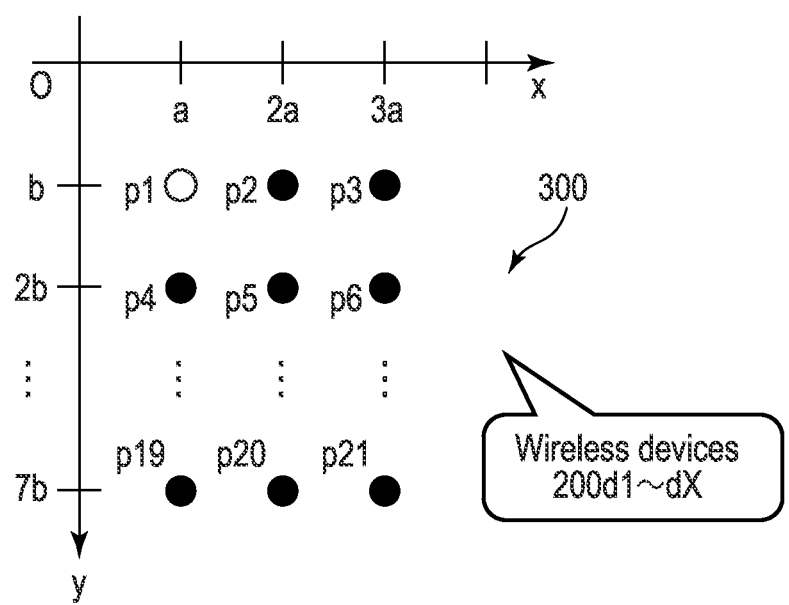
FIG. 23 is a diagram illustrating known information in which a wireless device 200$d$1 is located in a position candidate p1.

In this modification, the accuracy of estimation of the positions of the wireless devices 200 is improved, and amount of calculation for the estimation is reduced. The acquirer 101 further acquires information indicating position of at least one wireless device 200 among the wireless devices 200$d1$ to 200$d21$ (hereinafter, also referred to as known information). FIG. 23 is a diagram illustrating the known information in which the wireless device 200$d1$ is located in the position candidate p1 as an example of the present modification. The estimator 113 estimates the positions where the wireless devices 200$d2$ to 200$d21$ are located from the position candidates p2 to p21 further based on the known information. In this way, when the wireless devices 200$d1$ to 200$d21$ are arranged regularly, cases of point symmetry or rotational symmetry can be eliminated, and thus the accuracy of estimation of the positions of the wireless devices 200 can be improved and amount of calculation for estimation can be reduced.

(Fifth Modification)

Hereinafter, a modification example in which one or more functions of the estimation apparatus 100 are realized by a program will be described. The functions performed by the components of the estimation apparatus 100 may be realized by a processing device similar to the processor 110 processing a program. The program may be provided by being stored in a computer-readable storage medium such as a CD-ROM, a memory card, a CD-R, and a digital versatile disk (DVD) as a file in an installable format or an executable format. The program may be stored in a computer connected to a network such as the Internet and provided via the network, or may be provided by being incorporated in a storage medium such as a ROM, an HDD, or an SSD.

The modification of the present embodiment has been described above. These modifications may be used in combination. The estimation apparatus 100 according to the present embodiment estimates the positions where the wireless devices 200 are located from a plurality of position candidates based on position candidate information indicating position candidates where the wireless devices 200 are located and communication information in communication between the wireless devices 200. When the positions of the wireless devices 200 are estimated, a likelihood of the wireless device 200 located for each position candidate is determined. Depending on the position candidate, even if the estimation is performed using the communication information between the wireless devices 200, there is a possibility that a difference occurs in accuracy of the estimation of the located wireless devices 200. By determining the likelihood of the wireless device 200 located for each position candidate, the estimation apparatus 100 can determine a position candidate corresponding to the likelihood.

The determined position candidate can be notified to the user or used to estimate the positions where the wireless devices 200 are located. For example, the user can be notified of a position candidate for which the accuracy of estimation is considered to be low by notification. For a position candidate for which the accuracy of estimation is considered to be high, the wireless device 200 estimated to be located at the position candidate is determined as the known wireless device, and can be used for estimation of the position where the known wireless device 200 is located next time and thereafter.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus for estimating positions of a plurality of wireless devices from among a plurality of position candidates, the electronic apparatus comprising:
   a processor configured to:
      acquire a plurality of arrangements from the plurality of wireless devices and the plurality of position candidates based on position candidate information indicating the plurality of position candidates and communication information on communications between the plurality of wireless devices; and
      determine a position from among the plurality of position candidates as a first position, according to a likelihood of each of the plurality of wireless devices being located in each of the plurality of position candidates obtained from the plurality of arrangements.

2. The electronic apparatus according to claim 1, wherein the processor is configured to:
   acquire a first arrangement to an n-th arrangement (n is an integer equal to or greater than 2) based on the position candidate information and propagation data included in the communication information, and
   obtain the likelihood based on the first arrangement to the n-th arrangement.

3. The electronic apparatus according to claim 1, wherein the processor is configured to:
   acquire m arrangements (m is an integer of 3 or more) related to combinations of the plurality of wireless devices and the plurality of position candidates based on the position candidate information,
   acquire a first arrangement to an n-th arrangement (n is an integer equal to or greater than 2, and m>n) related to combinations of the plurality of wireless devices and the plurality of positions candidates based on the m arrangements and the propagation data, and
   obtain the likelihood based on the first arrangement to the n-th arrangement.

4. The electronic apparatus according to claim 2, wherein the processor is configured to:
   acquire the first arrangement to the n-th arrangement based on distances between the plurality of position candidates, and a correlation between virtual distances between the plurality of wireless devices in each of the plurality of arrangements and the propagation data.

5. The electronic apparatus according to claim 2, wherein the processor is configured to:
   obtain the likelihood for each of the plurality of wireless devices according to the number of the plurality of wireless devices estimated to be located in each of the plurality of position candidates among the first arrangement to the n-th arrangement.

6. The electronic apparatus according to claim 5, wherein the processor is configured to:
    group the plurality of wireless devices based on the propagation data,
    acquire the first arrangement to the n-th arrangement based on the grouped wireless devices,
    calculate a correlation value for each of the groups based on the number of the plurality of wireless devices counted as n, and
    obtain the likelihood further based on the correlation value.

7. The electronic apparatus according to claim 1, wherein the processor is configured to:
    determine which of ranges of a first likelihood to a k-th likelihood (k: an integer of 2 or more) the likelihood belongs to,
    determine a position candidate corresponding to the first likelihood as a position candidate corresponding to the k-th likelihood, and
    determine the position candidate corresponding to the first likelihood as the first position.

8. The electronic apparatus according to claim 1, wherein the propagation data indicates data of received power in communication between the wireless devices.

9. The electronic apparatus according to claim 1, further comprising a storage to hold the position candidate information, the communication information, and information indicating the first position.

10. The electronic apparatus according to claim 1, further comprising an outputter to output at least one of information indicating the estimated positions of the plurality of wireless devices or information indicating the first position.

11. The electronic apparatus according to claim 10, wherein:
    the processor is configured to determine a second position where an accuracy of estimation of a located wireless device is higher than that of the first position, according to the likelihood at the estimated position, and
    the outputter outputs information indicating the second position.

12. An electronic system comprising:
    an electronic apparatus for estimating positions of a plurality of wireless devices from among a plurality of position candidates; and
    the wireless devices,
    wherein the electronic apparatus comprises a processor configured to:
        acquire a plurality of arrangements from the plurality of wireless devices and the plurality of position candidates based on position candidate information indicating the plurality of position candidates and communication information on communications between the plurality of wireless devices; and
        determine a position from among the plurality of position candidates as a first position, according to a likelihood of each of the plurality of wireless devices being located in each of the plurality of position candidates obtained from the plurality of arrangements.

13. The electronic system according to claim 12, further comprising:
    a housing case; and
    a shield to partition an internal space of the housing case,
    wherein the wireless devices are provided inside the housing case, and at least two of the wireless devices communicate with each other through the shield.

14. A method for estimating positions of a plurality of wireless devices from among a plurality of position candidates, the method comprising:
    acquire a plurality of arrangements from the plurality of wireless devices and the plurality of position candidates based on position candidate information indicating the plurality of position candidates and communication information on communications between the plurality of wireless devices; and
    determining a position from among the plurality of position candidates as a first position, according to a likelihood of each of the plurality of wireless devices being located in each of the plurality of position candidates obtained from the plurality of arrangements.

15. The electronic apparatus according to claim 1, wherein:
    an arrangement from among the plurality of arrangements is determined based on the likelihood, and
    the arrangement determined based on the likelihood is output.

16. The electronic apparatus according to claim 1, wherein:
    the processor is configured to determine, from among the plurality of position candidates, a position candidate whose likelihood is higher than a first predetermined value or lower than a second predetermined value, as the first position, and
    the second predetermined value is lower than the first predetermined value.

17. An electronic apparatus comprising a processor configured to:
    estimate arrangements of wireless devices communicating with each other from among a plurality of position candidates in which the wireless devices are locatable, based on position candidate information indicating the position candidates of the wireless devices,
    determine a first position among the position candidates according to a likelihood of the wireless devices estimated to be located in the position candidates based on the arrangements,
    assume a first arrangement to an n-th arrangement (n is an integer equal to or greater than 2) for positions of the wireless devices from the position candidates based on the position candidate information and propagation data included in communication information between the wireless devices,
    count a number of wireless devices estimated to be arranged for each of the position candidates based on the first arrangement to the n-th arrangement,
    estimate positions of the wireless devices from among the position candidates based on the number of assumed arrangements and the number of counted wireless devices, and
    determine the likelihood based on the estimated positions of the wireless devices.

18. An electronic apparatus comprising a processor configured to:
    estimate arrangements of wireless devices communicating with each other from among a plurality of position candidates in which the wireless devices are locatable, based on position candidate information indicating the position candidates of the wireless devices, determine a first position among the position candidates according to a likelihood of the wireless devices estimated to be located in the position candidates based on the arrangements, group the wireless devices based on propagation data included in communication information between the wireless devices, assume a first arrangement to an n-th arrangement (n is an integer equal to or greater than 2) for positions of the wireless devices from the position candidates based on the position candidate information and the grouped wireless devices, calculate a correlation value for each of the groups based on the number of the assumed arrangements and a counted number of the wireless devices, and determine the likelihood based on the correlation value.

\* \* \* \* \*